United States Patent
Best et al.

(10) Patent No.: US 6,757,801 B1
(45) Date of Patent: Jun. 29, 2004

(54) METHOD TO MODIFY THAT AN OPERATION NEEDS TO BE DONE ON A FILE SYSTEM

(75) Inventors: Steve Francis Best, Georgetown, TX (US); David John Kleikamp, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 569 days.

(21) Appl. No.: 09/697,581

(22) Filed: Oct. 26, 2000

(51) Int. Cl.[7] ............................................. G06F 12/06
(52) U.S. Cl. ...................... 711/170; 711/112; 707/205; 707/206
(58) Field of Search ................................ 711/103, 112, 711/111, 114, 170, 172, 171, 208, 207, 209; 707/206, 205, 200, 100

(56) References Cited

U.S. PATENT DOCUMENTS

| | | | | |
|---|---|---|---|---|
| 5,398,142 A | * | 3/1995 | Davy | 360/48 |
| 5,574,907 A | * | 11/1996 | Jernigan et al. | 711/112 |
| 5,761,680 A | * | 6/1998 | Cohen et al. | 707/206 |
| 6,185,575 B1 | * | 2/2001 | Orcutt | 711/112 |
| 6,205,529 B1 | * | 3/2001 | Shagam | 711/170 |
| 6,397,311 B1 | * | 5/2002 | Capps | 711/170 |
| 6,463,515 B1 | * | 10/2002 | Stedman et al. | 711/170 |
| 6,470,436 B1 | * | 10/2002 | Croft et al. | 711/206 |
| 6,571,261 B1 | * | 5/2003 | Wang-Knop et al. | 707/206 |

OTHER PUBLICATIONS

Contiguous File Allocation Algorithm for the File Allocation System, IBM Technical Disclosure, vol. 38, Issue 4, Page(s) 133–134, Apr. 1995.*

* cited by examiner

*Primary Examiner*—Pierre Bataille
(74) *Attorney, Agent, or Firm*—David A. Mims, Jr.

(57) ABSTRACT

This invention involves a method to modify that an operation needs to be done on a file system. This involves the concept of "defragmentation", which is the process of rewriting parts of a file to contiguous sectors on a hard disk to increase the speed of access and retrieval. The present invention provides a system administrator who sets up a profile of when the file system should have the defragmentation utility run. There would be two fields in the profile; one for the number of times that contiguous allocation failed and the other is the size of the allocation. No application (file system utility) that uses the file system to tell when it is fragmented and that a defragmentation utility needs to be run.

12 Claims, 2 Drawing Sheets

METHOD TO MODIFY THAT AN OPERATION NEEDS TO BE DONE ON A FILE SYSTEM

TECHNICAL FIELD

This invention involves a method to modify that an operation needs to be done on a file system. This involves the concepts of "defragmentation", which is the process of rewriting parts of a file to contiguous sectors on a hard disk to increase the speed of access and retrieval.

BACKGROUND OF RELATED ART

When an application requests the file system create or append a file, the file system will attempt to allocate the required number of disk blocks contiguously. If contiguous disk blocks cannot be obtained, no indication or return code is given to the application to indicate that this problem occurred and noncontiguous blocks are allocated to this application. Subsequently, poorer performance can be observed within the application.

In the present art, this problem is solved by the user noticing that the file system performance is degrading and running a defragmented utility. This, however, is a haphazard way of resolving this problem, because the user may experience gradual performance degradation not readily attributable to disk fragmentation problems.

The following definitions are given to assist in making the present invention more readily understood.
Fragmentation: This is the scattering of parts of the same disk over different areas of the disk.
Fragmentation occurs as files on a disk are deleted and new files are added. Such fragmentation slows disk access and degrades the overall performance of disk operations. Utility programs are available for rearranging file storage on fragmented disks.
Defragmentation: The process of rewriting parts of a file to contiguous sectors on a hard disk to increase the speed of access and retrieval. When files are updated, the computer tends to save these updates on the larger continuous space on the hard disk which is often on a different sector than the other parts of the file. When the files are thus "fragmented", the computer must search the hard disk each time the file is accessed to find all of the parts of the file. This slows down the response time. For example, the operating systems Windows98™ and WindowsNT™ include fragmentation utilities as part of the operating system.
Flag: Broadly speaking it is a "marker" of some type used by a computer in processing or interpreting information; a signal indicating the existence or status of a particular condition. Flags are used in such areas as communications, programming and information processing. Depending on its use, a flag can be a code embedded in data that identifies some condition.
Extents: On a disk or other direct access storage device, a continuous block of storage space reserved by the operating system for a particular file or program.

SUMMARY OF THE PRESENT INVENTION

For optimal performance, a file written to a disk must be placed contiguously. Most advanced file systems provide a utility to perform defragmentation of the file system to improve performance. One aspect of the present invention is to create "extents" (disk blocks for a file) contiguously. There are cases, however, where the file system has been fragmented to a point that it is not able to allocate extents contiguously. These are when an application requests the file system create or append a file, the file system will attempt to allocate the required number of disk blocks contiguously. If contiguous disk blocks cannot be obtained, no indication or return code, is given to the application to indicate this problem occurred and noncontiguous blocks are allocated to this application. Subsequently, poor performance can be observed within the application. The present invention has been designed to correct this problem.

Thus, this invention involves a method to modify an operation that needs to be done on a file system to correct the above-referenced problem. This involves the concept of "defragmentation". The present invention provides a system "administrator" that sets up a profile of when the file system should have the defragmentation utility run. So there would be two fields in the profile; one for the number of times that contiguous allocation failed and the other is the size of the allocation. No application (file system utility) that uses the file system to tell when it is fragmented and that a defragmentation utility is needed to be run.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

As noted above, for optimal performance, a file written to a disk must be placed contiguously. Most advanced file systems provide a utility to do defragmentation of the file system to improve performance. One function of the present invention is to create "extensions" (disk blocks for a file) contiguously.

There are cases, however, where the file system has been fragmented to a point that it is not able to allocate extensions contiguously.

Figure 1:
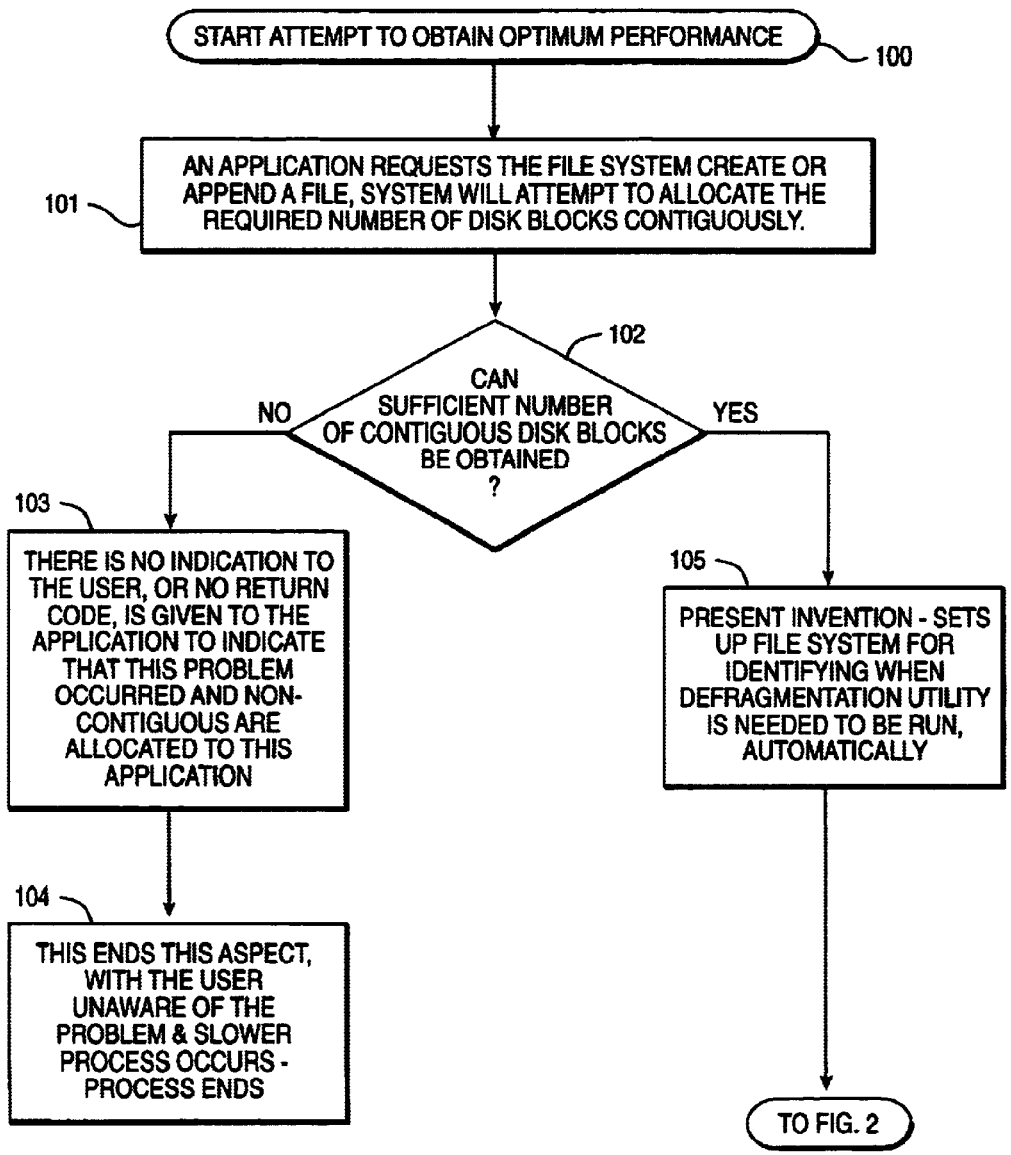
FIG. 1 represents a flowchart of when an application requests the file system be created, which will notify the user when the defragmentation utility needs to be run.

When an application requests the file system create, FIG. 1 at 101, or append a file, the file system will attempt to allocate the required number of disk blocks contiguously. If, query FIG. 1 at 102, contiguous disk blocks cannot be obtained, no indication or return code is given, FIG. 1 at 103, to the application to indicate this problem occurred and noncontiguous blocks are allocated to this application.

The problem is currently solved by the user noticing that the file system performance is degrading and then running a defragmentation utility, FIG. 1 at 104. This is a haphazard way of resolving this because the user may experience a gradual performance degradation, not readily attributable to disk fragmentation.

The present invention solves the problem in a file system, at FIG. 1 at 105, of identifying when the defragmentation utility needs to be run. To do this, three fields will be created in the file system's (FIG. 2 at 200) super block. A super block is a structure that holds information about the file system (e.g. file system size, volume label, block size and so forth).

The three fields are (FIG. 2 at 201):
1. Flag to indicate the noncontiguous allocation occurred.
2. Size of the request.
3. Counter of the number allocation failures.

Figure 2:
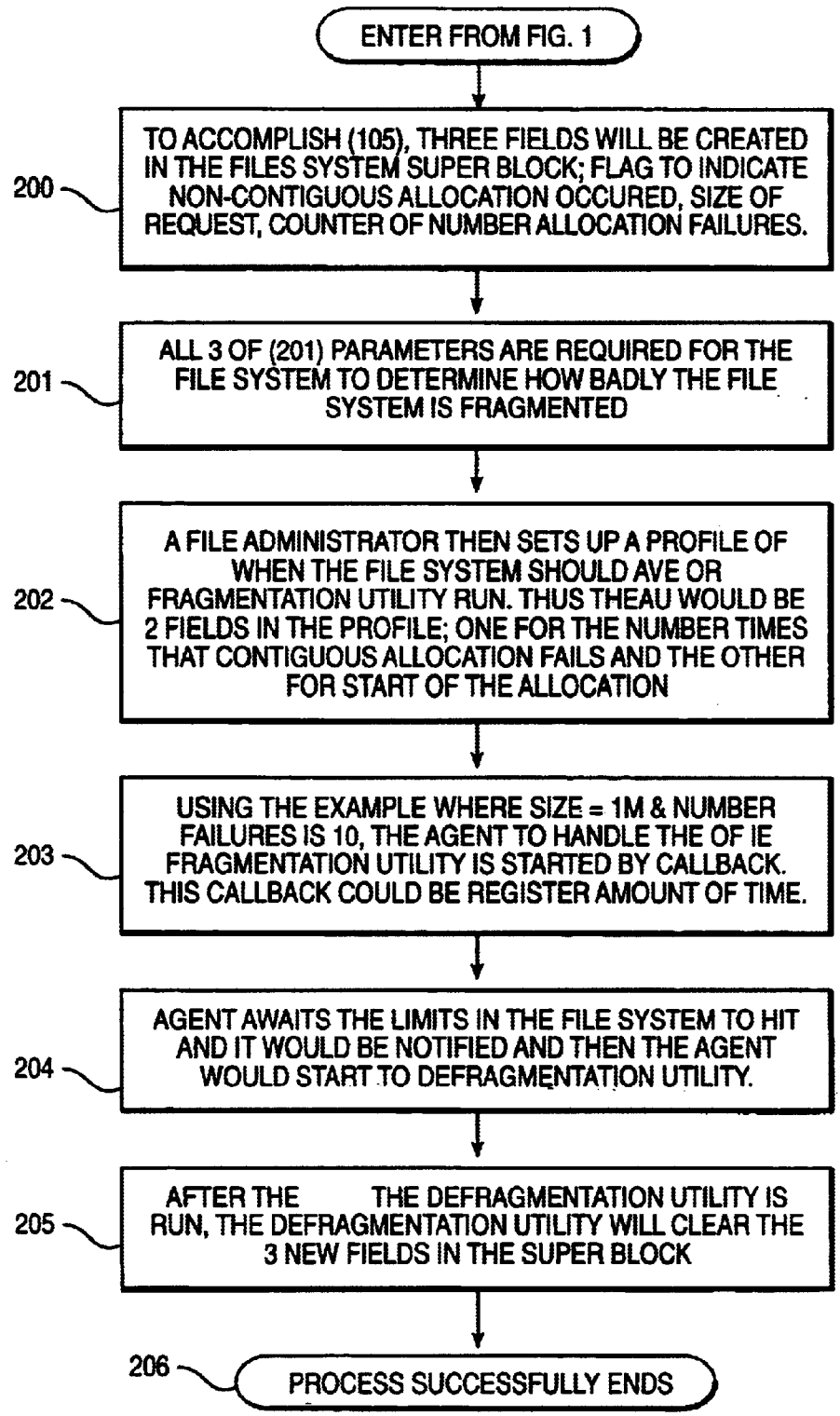
FIG. 2 is a flowchart extension of FIG. 1 and completes the demonstration of the method.

All three fields are needed for the file system to determine how badly the file system is fragmented (FIG. 2 at 201).

For example, if the file has the "contiguous failed flag" and the size that cannot be allocated is 1M and the count is 10, this file system needs to be defragmented very soon and the application could be modified; thus, avoiding a potential problem for the end user.

An additional part of this inventions is that an administrator (FIG. 2 at 202) would setup a profile of when the file system should have the fragmentation utility run; so there would be two fields in the profile: one for the number of times that contiguous allocation failed and the other, the size of the allocation. Using the example above (FIG. 2 at 203), the size=1M and number of failures is 10. The agent to handle the start of a defragmentation utility is started by call back and this call back could be registered at mount time. So the agent is just waiting for (FIG. 2 at 204) the limits in the file system to hit, causing the system to be notified and the agent to start the defragmentation utility. After the defragmentation utility is run, the defragmentation utility would clear the three new fields in the super block (FIG. 2 at 205). The defragmentation process successfully ends (FIG. 2 at 206).

As the Internet grows, there will be new requirements placed on the file systems to do streaming and file serving items through the World Wide Web (Web). All of the files in these types of environments must be fast and have contiguous disk blocks for these files to deliver optimal performance. No application (file system utility) that uses the file system to tell when it is fragmented and that a defragmentation utility needs to be run. Normally, the process to run the defragmentation utility is that the file system has been used for several months, the file system performance is no longer optimal and the user needs to run the defragmentation utility.

While the invention has been shown and described with reference to particular embodiments thereof, it will be understood by those skilled in the art that the foregoing and other changes in form and detail may be made therein without departing from the spirit and scope of the invention.

What is claimed is:

1. A computer based method for modifying operations to determine the need for "defragmentation" of a file comprising:

attempting to place said file written to a disk so that said file is placed contiguously on the hard drive;

identifying the extent that the fragmentation utility needs to be run by creating three fields in a file system's super block;

said three fields comprising:
a Flag to indicate a noncontiguous allocation occurred, the size of the request, and
a counter of the number of allocation failures;

determining when said file needs to be defragmented using said fields in order to attain the desired said contiguous file; and establishing a file administrator to setup a profile of when a file system has a defragmentation utility run on a specific file.

2. The method of claim 1, further including the step of: employing said administrator to establish two fields in said profile;

a first field for the number of times that contiguous allocation failed; and a second field for the size of the allocation.

3. A computer based method for modifying operations to determine the need for "defragmentation" of a file comprising:

attempting to place said file written to a disk so that said file is placed contiguously on the hard drive;

identifying the extent that the fragmentation utility needs to be run by creating three fields in a file system's super block;

said three fields comprising:
a Flag to indicate a noncontiguous allocation occurred, the size of the request, and
a counter of the number of allocation failures;

determining when said file needs to be defragmented using said fields in order to attain the desired said contiguous file; and employing a file system to create extents, for contiguously filling; and correcting a problem where a file is highly fragmented and not able to allocate extents contiguously.

4. A computer based method for modifying operations to determine the need for "defragmentation" of a file comprising:

attempting to place said file written to a disk so that said file is placed contiguously on the hard drive;

identifying the extent that the fragmentation utility needs to be run by creating three fields in a file system'super block;

said three fields comprising:
a Flag to indicate a noncontiguous allocation occurred, the size of the request, and
a counter of the number of allocation failures;

determining when said file needs to be defragmented using said fields in order to attain the desired said contiguous file;

creating extents or disk blocks for a file contiguously;

identifying when a file system requires that a said defragmentation utility needs to be run, by creating three different fields in the file system's super block;

said three different fields comprising:
a file system size,
a volume label, and
a block size.

5. A computer based system modifying operations to determine the need for "defragmentation" of a file comprising:

means for placing said file, written to a disk, so that said file is placed contiguously on the hard drive;

means for identifying the extent that a fragmentation utility needs to be run, by creating three fields in a file system's super block;

said three fields comprising:
a flag to indicate a noncontiguous allocation occurred, the size of the request, and
a counter of the number of allocation failures; and means for determining when said file needs to be defragmented using said fields in order to attain the desired said contiguous file, wherein a file administrator setup a profile of when a file system has a defragmentation utility run on a specific file.

6. The system of claim 5 wherein;
said administrator establishes two fields in said profile; a first field for the number of times that contiguous allocation failed; and a second field for the size of the allocation.

7. A computer based system modifying operations to determine the need for "defragmentation" of a file comprising:
   means for placing said file written to a disk, so that said file is placed contiguously on the hard drive;
   means for identifying the extent that a fragmentation utility needs to be run, by creating three fields in a file system's super block;
   said three fields comprising:
      a flag to indicate a noncontiguous allocation occurred, the size of the request, and
      a counter of the number of allocation failures;
   means for determining when said file needs to be defragmented using said fields in order to attain the desired said contiguous file, wherein
      the file system creates extents for contiguously filing; and correcting a problem where a file is highly fragmented and not able to allocate extents contiguously.

8. A computer based system modifying operations to determine the need for "defragmentation" of a file comprising:
   means for placing said file written to a disk, so that said file is laced contiguously on the hard drive;
   means for identifying the extent that a fragmentation utility needs to be run, by creating three fields in a file system's super block; said three fields comprising:
      a flag to indicate a noncontiguous allocation occurred, the size of the request, and
      a counter of the number of allocation failures;
   means for determining when said file needs to be defragmented using said fields in order to attain the desired said contiguous file, wherein said system creates extents or disk blocks for a file contiguously;
   means for identifying when a file system requires that a said defragmentation utility needs to be run, by creating three different fields in the file system's super block;
   said three different fields comprising:
      a file system size;
      a volume label, and
      a block size.

9. The computer program product having a programmable code included on a computer readable medium for a computer based system, modifying operations to determine the need for "defragmentation" of a file comprising:
   means for placing said file written to a disk so that said file is placed contiguously on the hard drive;
   means for identifying the extent to which the fragmentation utility needs to be run, by creating three fields in a file system's super block;
   said three fields comprising:
      a flag to indicate a noncontiguous allocation occurred, the size of the request,
      a counter of the number of allocation failures; and
   means for determining when said file needs to be defragmented using said fields in order to attain the desired said contiguous file, wherein
      a file administrator setup a profile of when a file system has a defragmentation utility run on a specific file.

10. The computer program product of claim 9 wherein:
said administrator establishes two fields in said profile; a first field for the number of times that contiguous allocation failed and a second field for the size of the allocation.

11. The computer program product having a programmable code included on a computer readable medium for a computer based system, modifying operations to determine the need for "defragmentation" of a file comprising:
   means for placing said file written to a disk so that said file is placed contiguously on the hard drive;
   means for identifying the extent to which the fragmentation utility needs to be run, by creating three fields in a file system's super block;
   said three fields comprising:
      a flag to indicate a noncontiguous allocation occurred, the size of the request,
      a counter of the number of allocation failures; and
      means for determining when said file needs to be defragmented using said fields in order to attain the desired said contiguous file, wherein
   the file system creates extents for contiguously filing; and
   correcting a problem where a file is highly fragmented and not able to allocate extents contiguously.

12. The computer program product having a programmable code included on a computer readable medium for a computer based system, modifying operations to determine the need for "defragmentation" of a file comprising:
   means for placing said file written to a disk so that said file is placed contiguously on the hard drive;
   means for identifying the extent to which the fragmentation utility needs to be run, by creating three fields in a file system's super block;
   said three fields comprising:
      a flag to indicate a noncontiguous allocation occurred, the size of the request,
      a counter of the number of allocation failures; and
      means for determining when said file needs to be defragmented using said fields in order to attain the desired said contiguous file,
   means for identifying when a file system requires that a said defragmentation utility needs to be run, by creating three different fields in the file system's super block;
   said three different fields comprising:
      a file system size,
      a volume label, and
      a block size.

* * * * *